(12) United States Patent
Allio et al.

(10) Patent No.: US 10,817,131 B2
(45) Date of Patent: Oct. 27, 2020

(54) SYSTEM AND METHOD FOR DISPLAYING AN AUTOSTEREOSCOPIC IMAGE WITH N POINTS OF VIEW ON A MOBILE DISPLAY SCREEN

(71) Applicant: ALIOSCOPY, Paris (FR)

(72) Inventors: Pierre Allio, Paris (FR); Flavien Maingreaud, Commeny (FR)

(73) Assignee: ALIOSCOPY, Paris (FR)

( * ) Notice: Subject to any disclaimer, the term of this patent is extended or adjusted under 35 U.S.C. 154(b) by 76 days.

(21) Appl. No.: 16/393,524

(22) Filed: Apr. 24, 2019

(65) Prior Publication Data

US 2019/0324623 A1 Oct. 24, 2019

Related U.S. Application Data

(60) Provisional application No. 62/668,754, filed on May 8, 2018.

(30) Foreign Application Priority Data

Apr. 24, 2018 (FR) ...................................... 18 53569

(51) Int. Cl.
*G06F 3/048* (2013.01)
*G02B 30/26* (2020.01)
*H04N 13/305* (2018.01)
*G06F 3/0481* (2013.01)
*G06F 3/0484* (2013.01)
*G06F 3/0488* (2013.01)
(Continued)

(52) U.S. Cl.
CPC ......... *G06F 3/04815* (2013.01); *G02B 30/26* (2020.01); *G02B 30/27* (2020.01); *G02B 30/30* (2020.01); *G06F 3/013* (2013.01); *G06F 3/017* (2013.01); *G06F 3/0488* (2013.01); *G06F 3/04845* (2013.01); *H04N 13/305* (2018.05); *H04N 13/31* (2018.05)

(58) Field of Classification Search
CPC . G06F 3/048; G06F 3/00; G06F 3/013; G06F 3/017; G02B 30/26; G02B 30/27; G02B 30/30; H04N 13/305; H04N 13/31
See application file for complete search history.

(56) References Cited

U.S. PATENT DOCUMENTS

2012/0182407 A1* 7/2012 Yoshida ................. H04N 13/31
   348/54
2015/0145977 A1 5/2015 Hoffman
(Continued)

OTHER PUBLICATIONS

Hong, et al., "Autosterioscopic Multi-View 3D Display with Pivot Function . . . ," Displays Devices, Tokyo, JP, vol. 29, No. 5, Dec. 1, 2008.

*Primary Examiner* — Hugo Molina
(74) *Attorney, Agent, or Firm* — Steven M. Greenberg, Esq.; Shutts & Bowen LLP

(57) ABSTRACT

A method for displaying an N-view autostereoscopic image formed of N elementary images interlaced according to a predetermined mixing scheme on a mobile display screen includes pivoting the screen; detecting a pivot angle α of the screen; rotating the N elementary images by an inverse angle of the detected pivot angle α, interlacing the N elementary images rotated according to the mixing scheme of the N elementary images in an initial direction, and displaying the N elementary images rotated on the display screen.

13 Claims, 5 Drawing Sheets

(51) Int. Cl.
*G06F 3/01* (2006.01)
*G02B 30/30* (2020.01)
*H04N 13/31* (2018.01)
*G02B 30/27* (2020.01)

(56) References Cited

U.S. PATENT DOCUMENTS

2015/0189256 A1* 7/2015 Stroetmann .......... H04N 13/366
 348/54
2015/0304623 A1* 10/2015 Yoon ................... H04N 13/361
 345/419
2016/0065936 A1 3/2016 Jang et al.
2016/0360187 A1* 12/2016 Smithwick ............. G06T 19/20
2018/0048884 A1 2/2018 De Zwart et al.

* cited by examiner

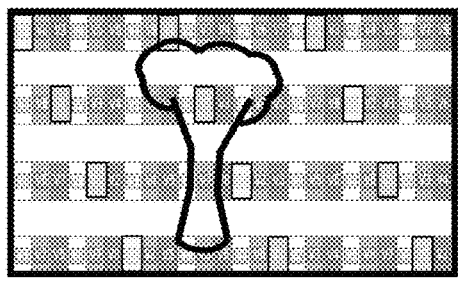 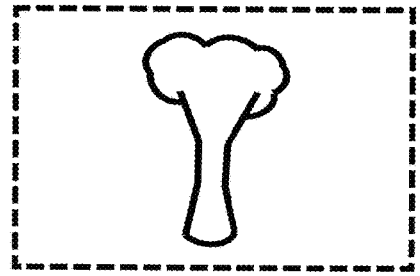 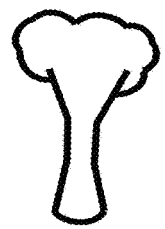
Figure 7a            Figure 7b            Figure 7c
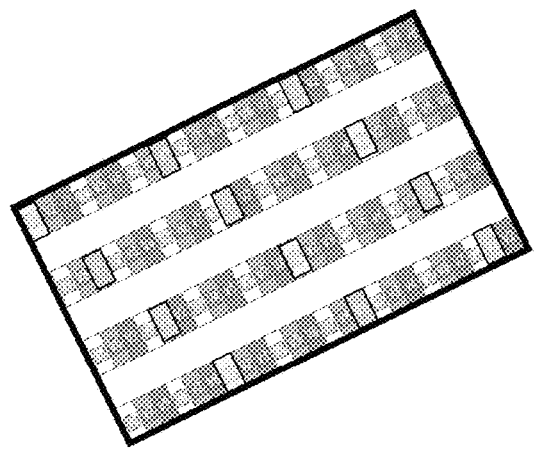 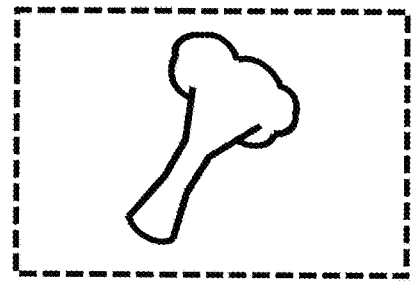 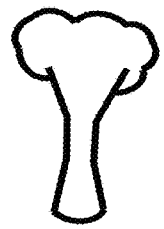
Figure 8a            Figure 8b            Figure 8c
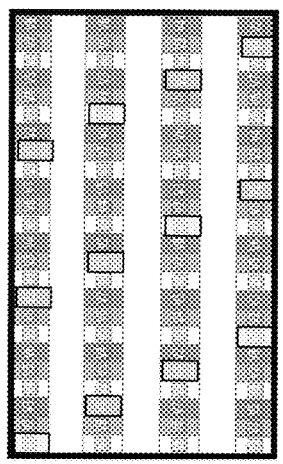 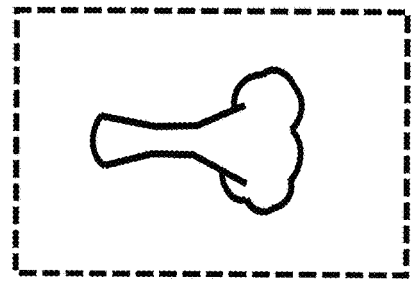 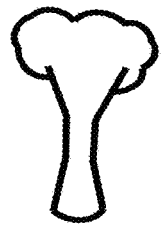
Figure 9a            Figure 9b            Figure 9c

SYSTEM AND METHOD FOR DISPLAYING AN AUTOSTEREOSCOPIC IMAGE WITH N POINTS OF VIEW ON A MOBILE DISPLAY SCREEN

CROSS REFERENCE TO RELATED APPLICATIONS

This application claims priority to U.S. Provisional Patent Application No. 62/668,754, filed May 8, 2019, which claims priority to French Patent Application Serial Number 1853569, filed Apr. 24, 2019, the entire teachings of which are incorporated herein by reference.

BACKGROUND OF THE INVENTION

Field of the Invention

The invention relates to a system and method for autostereoscopic display. The invention relates more particularly to a method and a system for displaying an autostereoscopic image with N points of view on a mobile display screen rotating about an axis, real or virtual, which extends perpendicular to the plane of the screen display.

Description of the Related Art

Autostereoscopy is a technique that enables images to be displayed in relief without requiring the observer to wear special eyewear. This technique itself constitutes prior knowledge, with reference in particular to the Patent Cooperation Treaty publications: WO2006/024764, WO2014/041504, WO2013/140363 and WO2014/016768.

Generally speaking, an autostereoscopic image consists of multiple elementary image bands interlaced according to a predetermined mixing scheme, corresponding to images of the same object or of the same scene from different points of view. A selector device, typically constituting an array of cylindrical lenticular lenses or a parallax barrier, is arranged in front of the display screen so as to allow the projection of a pair of elementary images corresponding to two different points of view of a single scene towards each of the two eyes of the observer, which creates an impression of relief in the brain of the observer.

One of the disadvantages of known autostereoscopic techniques lies in the large number of points of view that must be displayed simultaneously on the screen. Indeed, unlike eyewear technologies where only two points of view are necessary, autostereoscopy requires a large number of points of view to ensure the observer is not hindered by positioning constraints.

In the context of autostereoscopy, the screen can be thought of as 'wearing' the eyewear. It is known that a good compromise that combines good screen resolution, quality of the observed image and freedom of movement of the observer in front of the screen is to use eight different points of view.

Previously proposed has been an autostereoscopic screen that includes a pixel matrix arranged in rows and columns, each pixel being composed of multiple sub-pixels of different colors. The screen is further overlaid with a network of identical cylindrical lenticular lenses each having a focal length configured such that it returns the light rays coming from the screen to infinity. The width of the lenses is approximately equal to the width of 8 subpixels (since it is advised to use a single subpixel per point of view per lens and per horizontal line instead of one pixel). However, other configurations are possible without this substantially modifying the effect achieved. The spacing of the cylindrical lenticular network is precisely calculated so that the observer sees, at a predetermined distance from the screen (called the flat tint distance, which is for example fixed at 85 cm), the images shift in succession 6.5 cm (average distance between the eyes, chosen as the basis of calculation), due to the magnifying effect of the lenticular network.

This magnifying effect results from the fact that a lens placed at the right distance (its focal length) magnifies the sub-pixel which is in alignment with its optical axis and the pupil of the eye of the observer. If the lens is magnified 8 times, the sub-pixel seen through the lens is perceived 8 times wider than it is and obscures from the eye that receives the light through this lens the other 7 sub-pixels that are not in the alignment described above.

Thus, the observer only perceives one eighth of the resolution of the screen with each eye. These sub-pixels, combined to form an image or point of view, are all magnified 8 times perpendicular to the axis (in operation) of the lens, parallel to the meridian of the cylindrical lens. $\frac{7}{8}^{th}$ of the resolution remains to present the 7 other points of view according to the same method.

The space in front of the screen is then divided into zones of 52 cm, called lobes, in which one can successively perceive the 8 points of view every 6.5 cm. When moving from one lobe to the next a succession of 8 identical points of view is seen. Indeed, the same sub-pixels are observed by magnifying effects with the same lens array shifted by a lens to the right, or to the left, through the parallax effect because the plane of the pixels and the plane of the optical centers of the lenticular network are distant from each other.

Thus, an observer who moves parallel to the plane of the screen and 85 cm from it (in the case where the flat tint distance is set at 85 cm), from the rightmost position to the leftmost position (or conversely) sees with only one eye the points of view succeed one another every 6.5 cm, each series of 8 forming a lobe, with the same 8 forming the second lobe and so on.

The two eyes of the observer being 6.5 cm apart on average, when the right eye sees a point of view n (n being between 1 and 8 in the case of a screen with 8 points of view), the left eye sees the complementary point of view at n−1 or n+1 and the observer perceives an image in relief. When the observer moves to the left or to the right, his eyes change position, and thus points of view, simultaneously, and the sensation of viewing a real image persists.

The majority of autostereoscopic image display devices include an optical component configured to be effective in a predetermined orientation of the screen. Indeed, the lenses of a lenticular array may be either spherical or cylindrical, and the parallax barriers may consist of small transparent checkerboard areas or continuous lines alternating with opaque lines. In the case of cylindrical lenses, the magnifying effect is effective only in the direction of the meridian (perpendicular to the generator) and in the case of parallax barriers, the masking effect operates perpendicular to the opaque and transparent lines.

But using spherical lenses causes resolution in both directions to be lost at the same time, which severely affects perceived quality. In addition, the anisotropy of the structure of the pixel array generates very significant interference patterns in the direction parallel to the lines, which are continuous, black and often of very signifiicant thicknesses with respect to the height of the pixels.

It has therefore always been preferred to use cylindrical lenses with an almost vertical axis or parallax barriers having an equivalent orientation.

Thus, to separate the color points using the magnifying effect (in the case of a cylindrical lens), the axis of the lenses must be approximately vertical, when the color points succeed one another horizontally in triplets R, V, B or other combinations, forming each of the pixels of a horizontal line.

It also has already been proposed to incline the axis of the lenticular network by an angle $\alpha_o$ in the order of 18° to overcome the aforementioned problems.

A method of displaying an autostereoscopic image on a screen having its largest direction in the vertical direction yet further already has been proposed.

In other words, to date, the choice of a display screen determines how this screen can be used to display autostereoscopic images. Conversely, applications intended for use with an autostereoscopic display screen dictate the type of screen suitable for this use. In other words, whatever the pixel array used and the technology for selecting the points of view for autostereoscopy, a certain direction of use is defined by the set of technical parameters, whether they are due to the screen manufacturer's specifications or the technique chosen to generate autostereoscopy.

BRIEF SUMMARY OF THE INVENTION

Proposed herein is a new display method that overcomes the foregoing limitations inherent in the use of current screens. In particular, the disclosure set forth hereinafter provides a method for displaying an autostereoscopic image on a display screen that can be rotated about an axis (real or virtual) extending generally at a perpendicular angle to the plane of the screen so that the display can be adapted to the orientation of the screen so that the same screen can be used to project an autostereoscopic image regardless of the orientation of the screen, in particular in portrait or landscape mode or any intermediate orientation between portrait mode and landscape mode. Such a display method is therefore particularly suitable for mobile screens such as mobile phones or tablets that are used, alternately and according to the application in question, horizontally or vertically, or even in one or more intermediate positions between the horizontal position and the vertical position.

More specifically, the present disclosure aims to provide a system and method for displaying an autostereoscopic image with N points of view on a mobile display screen that enables a projected autostereoscopic image to be retained for multiple screen orientations around an axis perpendicular to its display plane, this axis of rotation may be real or virtual.

The purpose of the disclosure is in particular to provide a system and method for an autostereoscopic display which allows the user to turn the display device in one direction or the other and to continue to see the images in relief.

The disclosure also aims to provide, in at least one method of production of the invention, a method and a system for displaying an autostereoscopic image that makes it possible to maintain an identical relief effect, for multiple display screen orientation directions.

The disclosure also aims to provide, in at least one method of production of the invention, a method and a display system that can adapt to different types of screen, in particular to screens of mobile phones or touch tablets.

To do this, the invention concerns a method of displaying an autostereoscopic image including a series of N points of view numbered successively from 1 to N and formed of N elementary images interleaved according to a predetermined mixing scheme, on a mobile display screen rotating around a virtual or real axis extending perpendicularly to the display plane of the screen, the screen including a matrix of pixels arranged in rows and columns, each pixel being composed of multiple sub-pixels of different colors each of which is assigned to a point of view of the image.

In addition, the display screen is overlaid with an optical component, formed of a network of cylindrical lenticular lenses or Parallax barriers, the main axis being inclined at an angle $\alpha_o$ in relation to the direction of the columns, and configured to allow, when the screen is oriented according to a preferred direction of observation, the projection of predetermined pairs of different viewpoints formed from two distinct and separate viewpoints, within the series of N points of view, of at least one point of view displayed to the left eye and the right eye of an observer, respectively, and located at a nominal distance from the screen, known as flat tint distance.

A method according to the invention is characterized in that it includes:
  a display screen pivoting stage from an initial position corresponding to the the preferred direction of observation towards a position, called the rotated position,
  a pivot angle $\alpha$ detection stage of the the display between the the initial position and the rotated position,
  a rotation stage of the aforementioned N elementary images forming the N points of view of an inverse angle of the detected pivot angle $\alpha$, $-\alpha$
  an interlacing stage of the N elementary images rotated according to the mixing scheme of the N elementary images in the initial direction,
  a stage for the display of these N elementary images rotated on the the display screen in such a way that an observer perceives, on the the rotated screen, an image in relief extending along the the preferred direction, consisting of pairs of distinct successive points of view in the the series of viewpoints, and projected towards the observer's right eye and left eye, respectively.

One method according to the invention thus allows a projection in relief of a autostereoscopic image to be maintained for a plurality of orientations of the screen in relation to its initial direction.

The initial horizontal direction is considered to be that of the sub-pixel lines, whether the screen is initially in landscape or portrait mode.

The rotation appearing on the screen may consist of manually rotating the screen relative to a virtual axis that extends from the center of the screen. This rotation may also consist of rotating the screen in relation to a center axis, in which case this rotation is the combination of a centered rotation and a horizontal and/or vertical translation.

If one considers a screen equipped with an optical component having a main axis inclined at an angle $\alpha_o$ in the order of 18° in relation to the direction of the columns, configured for a preferred observation in landscape mode; the screen is then rotated by an angle of 90° ($\alpha$ is therefore equal to 90° in this example) in order to switch to a position of observation in portrait mode, the method according to the invention allows the same image to be displayed, with the same relief, both in landscape mode and in portrait mode, in close-up format, which can be translated, either by cropping or by a loss of part of the image and the neutral filling of the parts of the screen that are no longer used.

The horizontal displacement required to change point of view is 6.5 cm at the flat tint distance, so that the vertical displacement required to change the point of view is 6.5×3 cm. An angle of approximately 18° is obtained by an offset of 1 pixel horizontally for an offset of 3 pixels vertically. In addition, the three color dots making up each pixel are assembled to form a square, approximately. In other words, the color dots are inscribed in three small rectangles juxtaposed three times higher than their width to form a square, the pixel. On certain screens, including in OLED technology, manufacturers have added the color white, while retaining the principle of an approximately square pixel.

When the observer moves horizontally, he passes through the various points of view three times faster than when he passes through points of view in the vertical direction, as a result of the fact that the optical component is designed with an angle relative to the lines and columns of the screen.

If the lenticular network were perfectly vertical, this phenomenon would not exist. The invention therefore consists of using this peculiarity of inclined optical components in order to create relief vision according to orientations which differ from the initial orientation.

The eyes of an average reference observer are approximately 6.5 cm apart. It is therefore necessary that the points of view shift each 6.5 cm in the vertical direction if one wishes to use this direction to display an image in relief. Since points of view shift three times slower in the vertical direction than in the horizontal direction, if the points of view are numbered from 1 to N in ascending order, the range of pairs of points of view in the horizontal direction are therefore 1, −4 2, −5; 3, −6; etc. to be able to display the pairs 1-2; 2-3; 3-4 etc. in the vertical direction.

This being the case, the observer can visualize a relief image on the horizontally oriented screen, then rotate it by 90°, and vertically display the elementary images of the different points of view according to the same mixing scheme as in the initial position, this same observer can visualize the same vertical image in relief without any modification to equipment.

In the case of a square image, in order to allow it to be observed in both directions successively, one must rotate all the elementary images forming the autostereoscopic image, before interlacing them with the same mixing algorithm as for the horizontal display, and on the other hand choose images three times more distant from each other in the series of images available in order to achieve the same sensation of relief.

Indeed, in the absence of the invention, horizontally, the observer naturally sees the images 1 and 4, while vertically, he sees the images 1 and 2, three times less divergence than horizontally.

A method according to the invention is therefore particularly suitable for mobile equipment such as mobile phones and tablets that are used, depending on the application, in portrait or landscape mode.

In addition, these devices generally include means for detecting the orientation of the equipment, such as an inertial unit using an accelerometer and/or a gyroscope, which allow the user to use their equipment in both orientations without having to confirm this explicitly.

There are even applications that use the slightest movement of the screen to modify the observed content, thus serving as an intuitive control interface for manipulation and play.

A method according to the invention implemented in a mobile device therefore allows the equipment to be used both in portrait mode and landscape mode without the need to physically change the screen.

Advantageously, and according to the invention, the above-mentioned points of view projected toward the observer in the corresponding preferred direction, which are distance sensitive, that is to say, stereoscopic, correspond to the range of movement required in this preferred direction by the user to the flat tint distance mentioned above, in order to shift from one point of view to another; the method additionally includes a stage to calculate a stereoscopic base modified depending on the pivot angle α seen above, which is detected so that the pairs of points of view projected toward the observer by the above optical component in the above pivot position are identical to those projected in the initial direction, such that the observer has the same sensation of relief while the screen is pivoted at the pivot angle mentioned above as before the screen is pivoted, with the exception of screen pivot angles at which the axis of the eyes of the observer coincide with the axis of the lenticular lenses of the lenticular network.

According to this advantageous variation, the method also includes a stage to calculate a stereoscopic base modified which depends on the stereoscopic base in the preferred direction of observation, the inclination ao of the optical component with respect to the vertical plane and the screen pivot angle α with respect to the initial direction.

The stereoscopic base in the initial direction is an intrinsic characteristic of the display screen which depends on the pixel array used, the lenticular network used and in particular its pitch and its focal length.

The calculation of this modified stereoscopic base and the displaying of images in accordance with this modified stereoscopic base enables an unchanging sensation of relief to be maintained regardless of the orientation of the screen (with the exception of orientations for which no relief vision is possible, as explained above and corresponding to screen pivot angles which cause the axis of the observer's eyes and the axis of the lenticular lenses of the lenticular network to coincide).

Advantageously, and according to the invention, the method also includes a stage for the detection of the axis extending between the eyes of the observer, such that the preferred direction mentioned above may be defined with respect to the initial position.

This variant of the invention allows the axis of the observer's eyes to be automatically detected in order to follow the apparent rotation of the screen with respect to the axis of the preferred observer's eyes continuously. In this way it is possible to incline the observed image so that the image is constantly parallel to the axis of the eyes, or horizontal, or orientated according to a pre-selected direction. The images are inclined in the same manner before interlacing according to the same mixing scheme (that is, as though they were horizontal, which corresponds to the initial position) and by adapting the stereoscopic base to the angle of rotation detected so that the sensation of relief is constant.

Thus, if the screen is attached to a steering wheel, the invention allows the wheel to be turned, which pivots the screen, however the image remains level from the driver's point of view and continuously observable with modifications close to the usable border due to the requirement that the image viewed must remain inscribed within a rectangular or other form in rotation.

In the case of gaming consoles, this feature allows the position of the screen and its movement to be used in order to control the device, without losing the impression of relief, by constantly modifying the primary axis, the display of elementary images and the stereoscopic base in order to present a window which is continually effective and physiologically suitable.

When the axis of the user's eyes falls perfectly parallel with the axis of the lenticular lenses of the lenticular network, both eyes see the elementary image. Also, the sensation of relief disappears.

In other words, the invention allows a sensation of relief to be maintained whatever the pivot angle of the display screen, with the exception of screen orientations at which the axis of the user's eyes falls perfectly parallel with the axis of the lenticular lenses of the lenticular network.

Depending on the angle of the lenticular network and of the mixing scheme of elementary images, orientations exist for which both eyes will see the same point of view. For example, and as explained in the detailed description which follows, in the case of a lenticular network inclined at 18°, the sensation of relief disappears for pivot angles, with respect to the origin of the lenticular network, between 90° and 127° and between 270° and 307°. For all other pivot angles, the invention allows the sensation of relief to be maintained.

One method according to the invention allows all types of autostereoscopic images to be displayed, irrespective of the number of points of view including the autostereoscopic image. The invention can, for example, allow images included of 8 points of view (N=8) to be displayed.

According to an advantageous variant of the invention, the method also allows an autostereoscopic image with 2 points of view (N=2) to be displayed.

To do this, the above-mentioned stage in which the pivot angle $\alpha$ of the display screen between the initial position and the pivot position includes a detection stage, occurring at each instant, for the axis between the eyes of the observer so as to allow the angle between the initial direction and the axis between the eyes of the observer to be defined, this angle being the pivot angle, $\alpha$.

The method according to this variant thereby allows the position of the eyes of the observer to be detected, and therefore enables the display to be adapted according to the angle detected between the axis between the eyes of the observer and the initial direction of the display screen. It is therefore possible, regardless of the angle detected, to display images in such a way that the two points of view are presented separately to the right and left eyes of the observer.

Advantageously and according to the invention, the predetermined mixing schema consists in displacing each point of view of a sub-pixel of different color from one line to the next of the pixel matrix with respect to its position on the preceding line where the angle $\alpha o$ is set at approximately 18° with respect to the preferred direction.

According to this variant, the angle $\alpha o$ is set at approximately 18°. This advantageous variant is particularly designed for screens with a preferred direction on the horizontal plane. As indicated above, since the shifting of points of view in the vertical direction is three times slower than in the horizontal direction, if the series of points of view is numbered from 1 to N in ascending order, point of view pairs in the horizontal direction are therefore selected as: 1-4; 2, –5; 3, –6; etc. to allow the following pairs to be displayed in the vertical direction 1-2; 2-3; 3-4; etc.

However, according to other variants, the optical component may have a different inclination with respect to the direction of the columns without this changing the invention. An inclination other than 18° simply modifies the distribution of points of view and the adaptation of the display as a function of the pivot angle $\alpha$ detected.

Thus, according to another variant of the invention, the predetermined mixing scheme consists in shifting each point of view of two sub-pixels of different colors from one line to another of the pixel matrix with respect to its position on the previous line and the angle $\alpha o$ is set in the order of 33° with respect to the initial direction.

An angle $\alpha o$ in the order of 33° corresponds to an offset of 2 pixels horizontally for an offset of 3 pixels vertically. Also, if we interlace the elementary images forming the autostereoscopic image so that the points of view are shifted by two sub-pixels at each line change (each sub-pixel being three times higher than wide), the shifting of points of view in the vertical direction are thus one and a half times slower than in the horizontal direction. Also, if the series of points of view is numbered from 1 to N in increasing order, the pairs of points of view in the horizontal direction can be chosen as 1-4; 2, –5; 3, –6; etc. in order to display in the vertical direction the 1-3 pairs; 2-4; 3-5; etc. and thus maintain a sensation of relief very similar in the vertical direction and in the horizontal direction.

The invention also relates to a system for displaying an autostereoscopic image including a series of N points of view numbered successively from 1 to N and formed of N elementary images interleaved according to a predetermined mixing scheme including:

a mobile display screen rotated about a virtual or real axis extending perpendicular to the display plane of the screen, the screen including an array of pixels arranged in rows and columns, each pixel being composed of a multipe subpixels of different colors each assigned to a point of view of the image characterized in that the system further includes:

an optical component mounted on the screen, of the cylindrical lens network or parallax barrier type, with a main axis inclined at an angle $\alpha o$ with respect to the direction of the columns, and configured to allow, when the screen is oriented according to a preferred direction of observation in a position, called the initial position, the projection of predetermined pairs of different points of view formed from two points of view separated from each other, in the series of N points of view, by at least one point of view, respectively to the left eye and the right eye of an observer, located at a nominal distance from the screen, called the flat tint distance, means for detecting a pivot angle $\alpha$ of the display screen between the initial position and a rotated position, a module for the rotation of the N elementary images forming the N points of view of an inverse angle of the detected pivot angle $\alpha$, that is to say $-\alpha$ a module for the mixing of the N elementary images rotated according to the mixing scheme of the N elementary images in the initial direction, a module for the display of the N elementary images rotated on the display screen so that an observer can perceive, on the rotated screen, a relief image extending along the preferred direction, formed of pairs of different successive points of view in the series of points of view, and projected respectively to the right eye and the left eye of the observer.

A display system according to the invention advantageously implements a display method according to the invention and a display method according to the invention is advantageously implemented by a display system according to the invention.

Also, the advantages and effects of the display method according to the invention apply to the display system according to the invention.

Throughout the text, module means a software component, a subset of a software program, which can be compiled separately, either for independent use, or to be assembled with other modules of a program, or a hardware component, or a combination of a hardware component and a software subprogram. Preferably, the modules of the system according to the invention are subsets of a software program intended to be executed by a microprocessor combined with the display screen.

Advantageously and according to the invention, the system further includes means for detecting the axis between the eyes of an observer so as to define the initial direction with respect to this axis forming the new preferred direction.

These means of detection may be of any suitable type. It may for example be a device known in English terminology as a "tracking" device, which detects the position of the eyes of the observer and identifies the axis between the two eyes detected.

Advantageously and according to the invention, the means for detecting a pivot angle α of the display screen between the initial position and a rotated position include an inertial unit integral to the display screen.

Such a central unit includes for example one or more accelerometers and one or more gyroscopes configured to be able to detect the position in space of the display screen integrated with the central unit.

Advantageously and according to the invention, the display screen is an 8 point of view screen.

Such a screen is preferably the display screen of a touch pad or a smartphone.

The invention also relates to a display method and a display system characterized in combination by all or some of the characteristics mentioned above or below.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
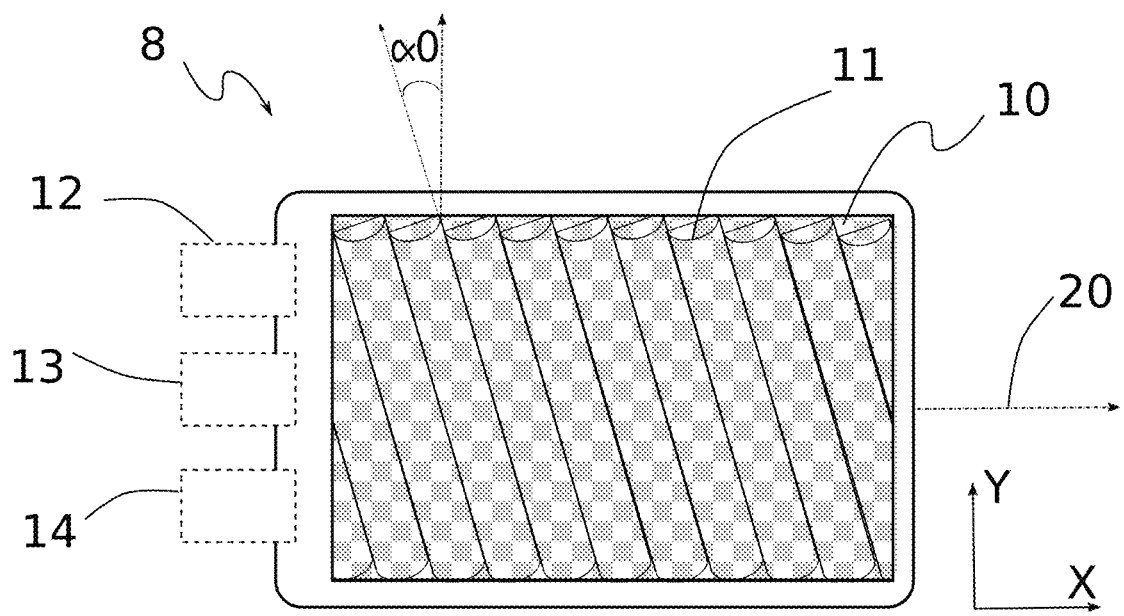
FIG. 1 is a schematic view of a display system according to one method of production of the invention.

FIG. 1 schematically illustrates an display system 8 of an autostereoscopic image with eight points of view including a display screen of a touch screen tablet. This screen includes a matrix 10 of pixels arranged by rows and columns overlaid by a network 11 of cylindrical lenticular lenses with its main axis inclined at an angle $\alpha_o$ with respect to the direction of the columns. This angle $\alpha_o$ may be 18° for example.

Figure 5:
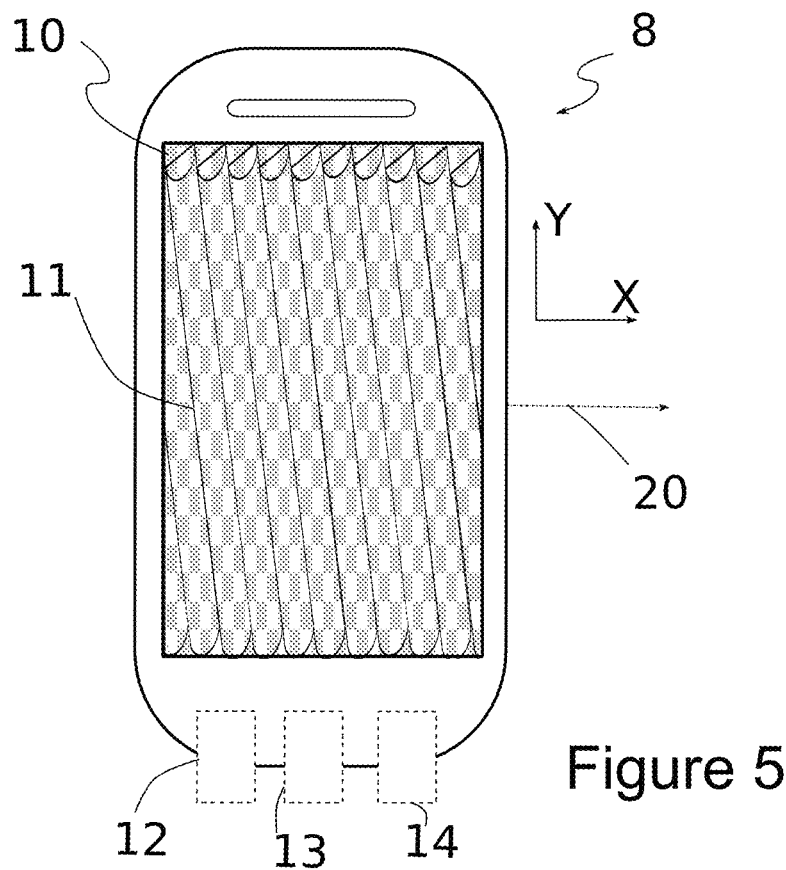
FIG. 5 is a schematic view of a display system according to another method of production of the invention.

Of course, according to other methods of production, the display system may be a mobile telephone of the "computer phone" type, better known under the English name of smart-phone or any equivalent display system. FIG. 5 schematically illustrates a smart-phone according to the invention.

Figure 3A:
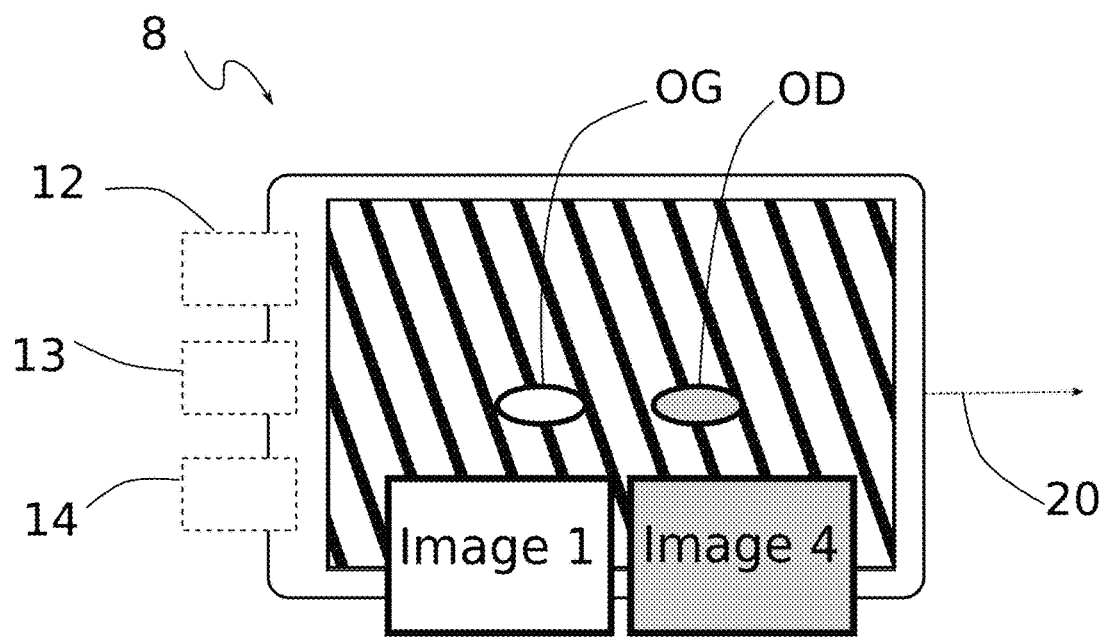
FIGS. 3a, 3b and 3c are schematic views of the points of view presented to each of the eyes of an observer located at the flat tint distance of by a method according to the invention as a function of the orientation of the screen.

The assembly formed of the screen and the network 11 of cylindrical lenticular lenses is configured to allow, when the screen is oriented in an initial direction of observation 20, which is the horizontal direction in the case illustrated by FIGS. 1 and 5, the projection of predetermined pairs of points of view respectively to the right eye RE (OD) and the left eye LE (OG) of an observer located at a nominal distance from the screen, at the the 'flat tint' distance. The points of view are numbered from 1 to 8 in ascending order and the system is configured so that the pairs of predetermined points of view presented to the observer in the horizontal direction (which is the initial direction of observation 20 according to the method of production in figures) are, for example, pairs 1-4; 2-5; 3-6; 4-7; 5-8. Of course, other configurations are possible and those skilled in the industry will determine without difficulty how to adapt the following description to another starting configuration. FIG. 3a illustrates the projection of pair 1-4 as an example. In other words, the eyes LE and RE of the observer located at the flat tint distance of system 8 perceive, respectively, images 1 and 4, forming the points of view 1 and 4 among the 8 points of view of the autostereoscopic image. This projection is related to the configuration of the system. It is of course possible to design another basic configuration according to needs and applications.

The screen is rotatable around at least one real or virtual axis that extends perpendicular to the screen. In other words, the screen can pivot in the plane X, Y shown schematically in FIG. 1. This screen is therefore suited to implementing step E1 related to pivoting the display screen from an initial position corresponding to the preferred direction of observation to a subsequent position, called the rotated position. The pivoting of the screen around an axis perpendicular to the screen is for example the result of a manual action by a user.

The system also includes an inertial unit 12 constituting a means for detecting a pivot angle α of the screen. Most current tablet devices have such an inertial unit internally that determines the position of the screen relative to a starting position. This inertial unit 12 implements the step E2 of detecting the pivot angle α of the screen of the method according to the invention illustrated in FIG. 2.

The system also includes a module for the rotation of the elementary images by an angle inverse to the angle α, i.e. −α the range of pivoting detected. Such a module may be for example a software program operating on the display system 8, and configured to be executed by a processor within the display system (touch pad or smart-phone for example).

The rotation of the images is inverse to the rotation of the screen so that the observer can observe a level image, that is to say an image which extends along the preferred direction of observation, when the screen is rotated. In other words, the screen rotates, but the perceived image remains oriented in the preferred direction of observation due to this reverse rotation of the images. This rotation module implements step E3 of the method according to the invention illustrated in FIG. 2.

The system also includes a module for interlacing of the elementary images according to the mixing diagram of the autostereoscopic image used in the initial direction of observation. In other words, the elementary images are interlaced with the same mixing scheme as before the rotation of the screen. Such a module may be for example a software program operating on the display system 8, and configured to be executed by a processor within the display system (touch pad or smart-phone for example).

Figure 2:
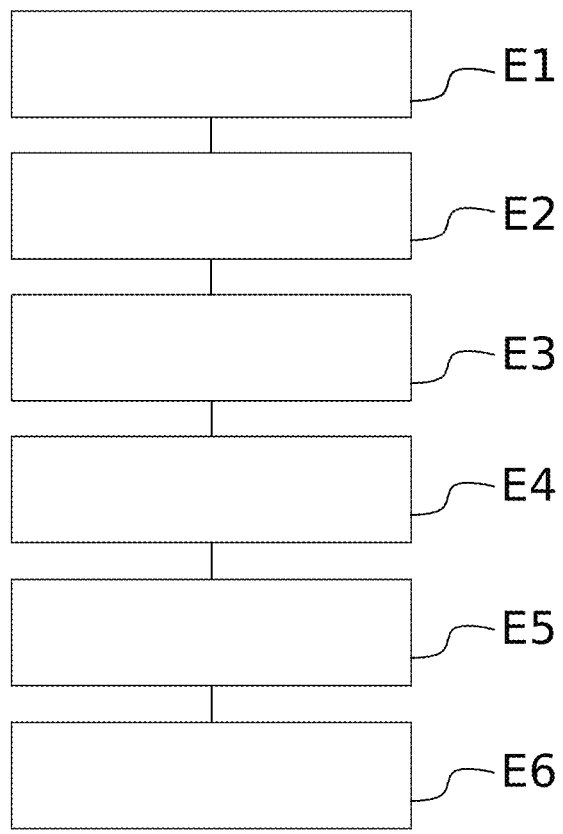
FIG. 2 is a schematic view of a method according to one method of production of the invention implemented by a system according to the invention.

This mixing module implements step E4 of the method according to the invention illustrated in FIG. 2.

The system also includes, according to a preferred method of production, a module 13 for calculating a modified stereoscopic base which depends on the detected pivot angle α in order to be able to project toward the observer the points of view of the autostereoscopic image identical to those projected in the initial horizontal direction. This module therefore implements the step E6 of calculating a modified stereoscopic base depending on this pivot angle α detected so that the pairs of points of view projected towards the observer by the optical component in this rotated position are identical to those projected in the the original direction. This step is described below in detail in connection with FIGS. 3*a*, 3*b*, 3*c* and 4. This calculation module 13 is for example a software program operating on the display system 8 and configured to be executed by a processor within the display system.

Finally, the system includes a module 14 for displaying the viewpoints according to the modified stereoscopic base so that the sensation of relief for the observer in front of the screen 10 rotated by the angle α is identical to that in the initial direction of observation. This calculation module 14 may be for example a software program operating on the display system 8 (touch pad or smart-phone for example) and configured to be executed by a processor within the system.

This module therefore implements the step E5 for displaying the N viewpoints of the image along the modified stereoscopic base (in the case where the base is actually modified taking into account the relief intended for the observer in the rotated position) so that the sensation of relief for the observer in front of the rotated screen at the detected rotation angle may be identical to that in the initial direction of observation. This step is described below in detail in connection with FIGS. 3*a*, 3*b*, 3*c* and 4.

As indicated above, the term module means a software component, a subset of a software program, which can be compiled separately, either for independent use, or to be assembled with other modules of a program, or a hardware component, or a combination of a hardware component and a software subprogram. Such a hardware component may include an integrated circuit specific to an application (better known under the acronym ASIC for the English name application-specific integrated circuit) or a programmable logic circuit (better known under the acronym FPGA for the English name Field-Programmable Gate Array) or a dedicated microprocessor circuit (better known by the acronym DSP for the English name Digital Signal Processor) or any equivalent hardware. In general, a module is an element (software and/or hardware) that manages a function.

The steps for calculating a modified stereoscopic base, a function of the pivot angle α, and for displaying the points of view of the image according to this modified stereoscopic base are described below in connection with FIGS. 3*a*, 3*b*, 3*c* and 4.

We consider a reference point linked to the screen whose origin is for example the center of the screen, the horizontal axis is designated by X, the vertical axis is designated by Y and the normal axis on the screen is Z. The autostereoscopic image is an image with N points of view, with N=8, and the viewpoints are numbered from 1 to N in ascending order.

Figure 4:
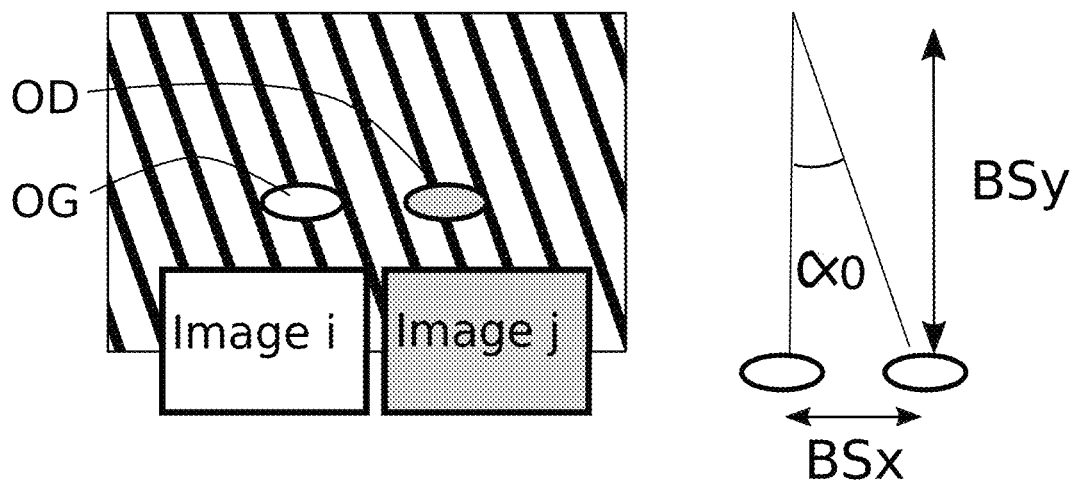
FIG. 4 is a schematic view of a display screen in the horizontal position on which X and Y stereoscopic bases are represented.

In FIG. 4, BSx denotes the stereoscopic base of the X-axis system, that is to say the distance to be traversed horizontally to change the point of view by an observer situated at the flat tint distance, hereinafter denoted by FtD. In other words, at the position (0, 0, FtD), the observer sees with one eye (the left for example) the point of view i and sees with this same eye the point of view i+1 at the position (BSx, 0, FtD).

BSy refers to the stereoscopic base of the Y system, i.e. the distance to be travelled vertically to change the point of view by an observer located at the flat tint distance FtD. In other words, at the position (0, 0, FtD), the observer sees with one eye (the left for example) the point of view j and sees with this same eye the point of view j+1 at the position (0, BSy, FtD).

As the cylindrical lenticular network is inclined at an angle α0 with respect to the vertical, BSx and BSy are linked by the following relationship:

$$BSx = \tan(\alpha 0) * BSy$$

If by LE we designate the position of the left eye of the observer and by RE, the position of the right eye of the observer, the phase shift D between the two eyes of the observer, that is, the difference in the number of points of view between the left eye and the right eye is determined by the following relationship:

$$D = Dx/BSx + Dy/BSy$$

where Dx and Dy represent the projection of the RE-LE vector of the observer on the horizontal axis and on the vertical axis, respectively.

When the display screen pivots by an angle α with respect to the initial direction of observation, which is the horizontal direction in the present case, this angle α is the angle that the axis between the two eyes RE and LE of the observer relative to the initial direction.

If by DIY we designate the distance between the two eyes of the observer, which is on average 6.5 cm, Dx and Dy are determined by the following relationships:

$$Dx = \cos(\alpha) * DIY$$

$$Dy = \sin(\alpha) * DIY$$

We can therefore determine the phase difference between the two eyes by the following equation:

$$D = DIY/BSy * (\cos(\alpha)/\tan(\alpha) + \sin(\alpha))$$

The invention thus makes it possible to calculate the phase difference between the two eyes of the observer, that is to say the points of view presented to each observer's eye as a function of the position of the screen with respect to the initial direction.

It is therefore possible to modify the stereoscopic base from this value of the calculated phase shift.

It is also possible to determine the orientations for which both eyes see the same point of view.

The table below shows the first two viewpoints visible to the observer for a network configuration inclined at 18°. The alpha angles indicated are those for which a change of projected pairs occurs.

| α | D | Two first pairs projected |
|---|---|---|
| 0 | 3 | 1-4/2-5 |
| 69 | 2 | 1-3/2-4 |
| 90 | 1 | 1-2/2-3 |
| 127 | −1 | 8-7/7-6 |
| 148 | −2 | 8-6/7-5 |
| 180 | −3 | 8-5/7-4 |
| 249 | −2 | 8-6/7-5 |
| 270 | −1 | 8-7/7-6 |
| 307 | 1 | 1-2/2-3 |
| 324 | 2 | 1-3/2-4 |

It can be seen that no relief may be observed at the orientations for which D is, in absolute value, less than 1. In other words, no relief may be observed for a pivot angle between 90° and 127° and between 270° and 307°.

The table below shows the first two viewpoints visible to the observer for a 33° inclined network configuration. The alpha angles indicated are those for which a change of projected pairs occurs.

| α | D | Two first pairs projected |
|---|---|---|
| 0 | 3 | 1-4/2-5 |
| 90 | 2 | 1-3/2-4 |
| 108 | 1 | 1-2/2-3 |
| 140 | −1 | 8-7/7-6 |
| 157 | −2 | 8-6/7-5 |
| 180 | −3 | 8-5/7-4 |
| 270 | −2 | 8-6/7-5 |
| 288 | −1 | 8-7/7-6 |
| 320 | 1 | 1-2/2-3 |
| 336 | 2 | 1-3/2-4 |

It is found that in this configuration, no relief may be observed for a pivot angle between 108° and 140° and between 288° and 320°.

Thus, in this configuration, when the screen is rotated at 90°, that is to say for example that it is switched from a landscape position to a portrait position, it is still possible to rotate the screen by 18° before the relief disappears while in the previous configuration, the unfavorable position can intervene soon after switching to portrait mode. This provides additional flexibility in using a screen in this configuration.

FIG. 3a illustrates the display screen oriented in the initial horizontal direction of observation. The system is configured so that at the flat tint distance, the views 1 and 4 are presented to the left eye and to the right eye of the observer, respectively. In this figure, the inclined lines schematically represent the inclined lenticular network of an angle α0 (which is preferably set at 18° or 33° as explained above).

Figure 3B:
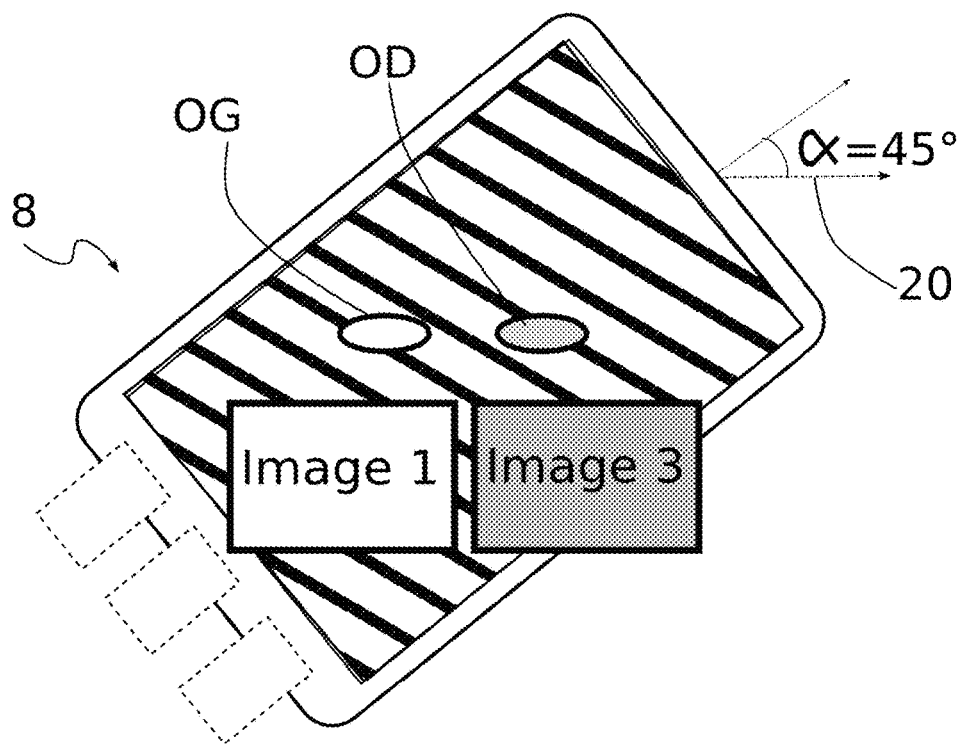

FIG. 3b illustrates the display screen rotated by an angle α with respect to the initial direction, which in this example corresponds to 45°. The phase difference between the two eyes in this position is calculated according to the preceding formula and makes it possible to determine that the distance between the two eyes corresponds to three views (for an angle at 18°). Also, in this orientation, views 1 and 3, or 2 and 4, and so on are presented to the left eye and the right eye of the observer, respectively. It is therefore possible for the display module either to replace the view 4 by the view 5 so that the sensation of relief is identical to that felt at the initial position of the screen, that is to say the position of FIG. 1, or to display the point of view 1, instead of the point of view 2 in which case the sensation of relief is identical to that felt at the initial position of the screen, but with a slight shift of the axis of the scene observed compared to the other possible correction.

Figure 3C:
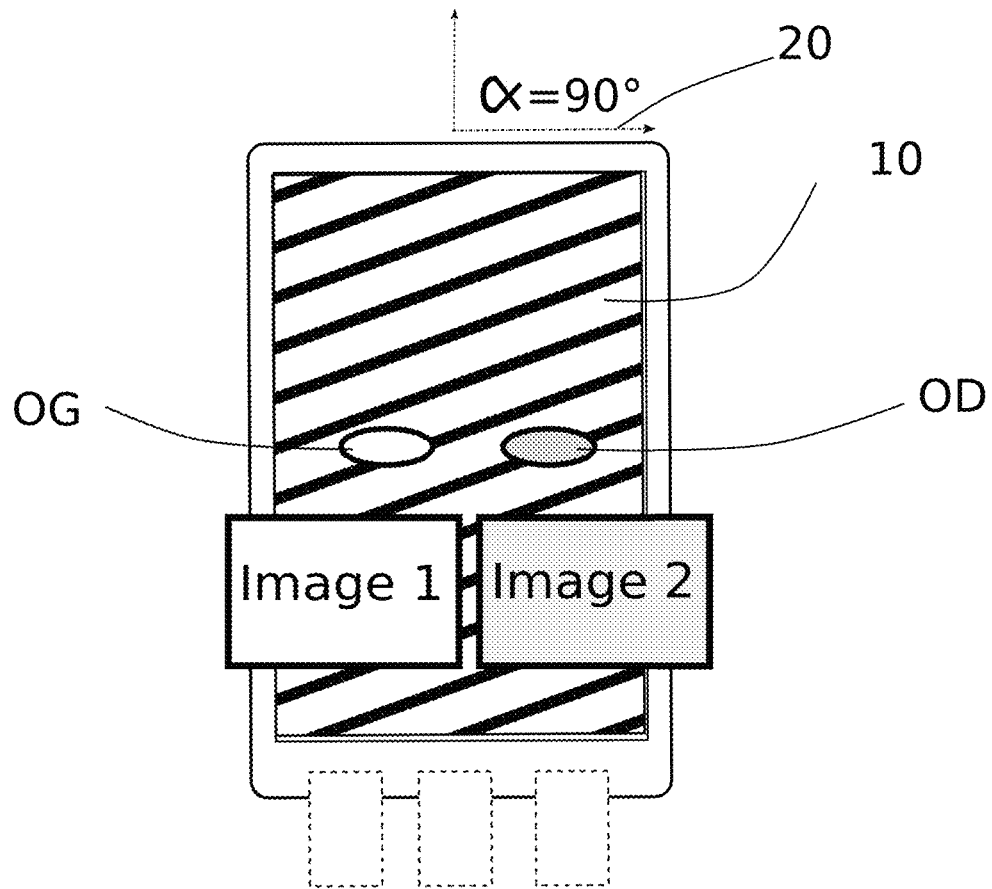

FIG. 3c illustrates the display screen rotated at an angle of 90° to the initial horizontal direction. In other words, the screen has a vertical orientation. In this position, views 1 and 2, 2 and 3, 3 and 4 etc. are presented to the left eye and the right eye of the observer, respectively. It is therefore possible for the display module to substitute for view 4 the image of view 6 so that the sensation of relief is identical to that felt at the initial position of the screen, that is to say the position of FIG. 1, or to display the point of view 1 instead of the point of view 3 in which case the sensation of relief is identical to that felt at the initial position of the screen, with a slight shift of the axis of the scene observed with respect to the other possible correction.

It is therefore possible using a system and a method according to the invention, during the stage of displaying the N points of view on the rotated screen, to choose either the images of the series of N points which are defined by the calculation of the phase difference between the two eyes in this orientation, or to define a modified stereoscopic base which makes it possible to maintain the same sensation of relief during the rotation. To do this, it is sufficient to switch the points of view in the rotated position so that the images presented to each observer's eye correspond to the same pair of points of view as in the initial position. It is also possible to maintain a sensation of relief by undergoing a change of depth according to the orientations of the screen.

Those skilled in the industry understand that the phenomenon described is identical if it is no longer the screen that pivots from the initial observation position to the rotated position, but that it is the observer's head (or more precisely, the axis that connects the two eyes of the observer) that pivots in front of the screen. In other words, in this case, we can consider that the screen rotates by an angle −α relative to the axis of the eyes of the observer.

According to an advantageous method of production, the display screen is configured to display P points of view, called points of view of the screen, P being greater than or equal to 3, while the displayed image is an autostereoscopic image in only two points of view, in other words, N is equal to 2.

It is then possible according to this particular method of production to determine, from the detection of the position of the eyes of the observer (which is for example obtained by an ad-hoc tracking device carried by the display device), the sub-pixels of the screen which form bands visible to each eye and which therefore correspond to $1/P^{th}$ of the total screen, as well as the sub-pixels of the screen which form bands of the non-screen visible by neither of the two eyes of the observer at the detected position and which therefore correspond to $P-2/P^{th}$ of the total screen.

During the display step, it is then possible to assign to the sub-pixels of each visible band of the screen, for each eye of the observer at the detected position, the sub-pixels from the point of view corresponding to this eye, and to assign to sub-pixels bands of the screen which are not visible by any of the two eyes of the observer, subpixels corresponding to points of view, called safety points of view, built from the subpixels of the two points of view of the image to be displayed.

In other words, this advantageous variant makes it possible to display an autostereoscopic image which consists only of two elementary images to form only two points of view (respectively for the right eye and the left eye of the observer) on a screen configured to display at least 3 points of view (hereinafter referred to as multi-view screen). In other words, the invention according to this variant allows the operation of a multi-screen view (i.e. configured to display at least 3 points of view) to be altered, having a known, predetermined configuration (including the physical flat tint distance of the screen) and to display only two points of view so as to be able to use the pixels initially dedicated to the points of view of the screen not used, to display safety points of view constructed from both points of view of the image. These safety points of view make it possible to eliminate the lobe passages in particular and to improve the quality of observation in case of displacement of the observer with respect to the screen.

The portions of the screen that are visible according to the position of the observer change not only when the observer is moving parallel to the screen, but also when the observer is moving perpendicularly to the screen.

This advantageous variant therefore makes it possible to take into account all the movements of the screen (not only its pivoting about an axis normal to the screen, but also a relative displacement of the user with respect to the screen) to continually adapt the display on the screen.

The safety points of view can be formed by copying one of the points of view of the image, i.e. from the point of view dedicated to the right eye or the point of view dedicated to the left eye. For example, at the flat tint and, in the case of a multi-view screen configured to display 8 views, once the two points of view of the image are assigned to two views of the screen that depend on the position of the observer, the method can dictate that the remaining 6 safety views display 3 times the point of view of the image dedicated to the right eye and three times the point of view of the image dedicated to the left eye.

Figure 6:
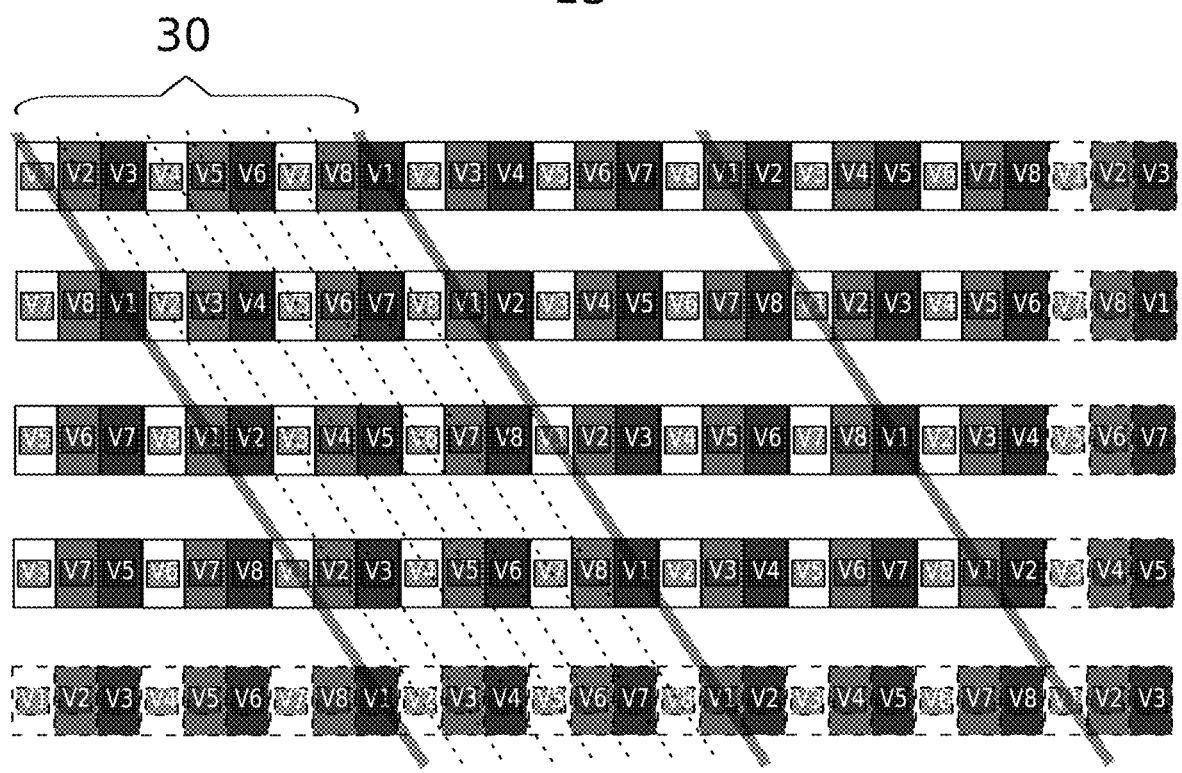
FIG. 6 is a schematic view of a portion of the pixel matrix of a display screen of a display system according to a method of production of the invention implementing a method according to one method of production of the invention, FIGS. 7a, 7b, 7c, respectively, are schematic views of the pixel matrix of the screen in FIG. 6, of the image displayed by a point of view by this screen and of the image perceived by an eye of an observer in a landscape screen orientation, FIGS. 8a, 8b, 8c, respectively, are schematic views of the pixel matrix of the screen in FIG. 6, of the image displayed by one point of view by this screen and of the image perceived by an eye of an observer for an inclined orientation with an angle of about 45° with respect to the landscape screen position, FIGS. 9a, 9b, 9c, respectively, are schematic views of the pixel matrix of the screen in FIG. 6, of the image displayed by a point of view by this screen and of the image perceived by an eye of an observer in a portrait screen orientation.

FIG. 6 schematically illustrates a portion of a display screen of a system according to a method of production of the invention.

Each subpixel of the image is associated with a point of view of the image. Thus, under the lenticular lens 30 of FIG. 6, the points of view V1, V2, V3, V4, V5, V6, V7 and V8 are assigned to each sub-pixel. Lenticular lens 30 and those following are inclined at an angle αo, which is for example 33°. As seen in FIG. 6, the mixing of the elementary images consists of an offset of two sub-pixels at each line change.

In the following, only the point of view V1, schematically represented by a tree in FIGS. 7a to 9c is considered, it being understood that the principle described applies mutatis mutandis to the other points of view.

FIG. 7a is a view of the pixel array of a display screen oriented in the initial direction of observation, which is the horizontal direction in this example. Each subpixel of the matrix associated with the view 1 includes a piece of information on the represented tree. In other words, the different sub-pixels of the view V1 highlighted in FIG. 7a enable the method to form, jointly, an image of the represented tree. FIG. 7b is a schematic view of the image actually displayed by the pixel array and FIG. 7c is an illustration of the image perceived by an observer. Of course, in practice, each eye of the observer sees an image of a different view (for example the view V1 with the left eye and the view V4 with the right eye) so that a relief image is perceptible by the observer.

FIG. 8a is a view of the pixel matrix of the display screen rotated by an angle α, in the order of 45°, with respect to the horizontal direction. According to the invention, the elementary image corresponding to the view V1 (and all other elementary images) is rotated by an inverse angle to the angle α i.e. −.α The image displayed by the screen is thus represented by FIG. 8b. This image is inclined at an angle opposite to the inclination of the screen shown in FIG. 8a. The different images are then interlaced according to the same mixing scheme as in the horizontal direction. FIG. 8c illustrates the observer's perception of the image, which has not changed, for the view V1, with respect to the horizontal position, despite the inclination of the screen. The perception of relief can, however, change between the horizontal position and the inclined position, depending on the point of view that is presented to the other eye of the observer, as explained above.

FIG. 9a is a view of the pixel array of the display screen rotated 90° with respect to the horizontal direction. According to the invention, the elementary image corresponding to the view V1 (and all the other elementary images) is rotated by an inverse angle. The image displayed by the screen is thus represented by FIG. 9b. The different images are then interlaced according to the same mixing scheme as in the horizontal direction. FIG. 9c illustrates the viewer's perception of the image, which has not changed, for view V1, with respect to the horizontal position, despite the vertical orientation of the screen.

The invention is not limited to the production methods described with reference to the figures. For example, according to other methods of production not shown, a display system according to the invention may be associated with a projection device which projects an aerial and dematerialized autostereoscopic image for instance that described in the request under the Patent Cooperation Treaty Number PCT/FR2018/050563 and commercially available in connection with the trade name EXOBOX™.

Indeed, the optical device of EXOBOX™ can transport an autostereoscopic image optically to provide a floating and dematerialized representation of the image. To do this, the optical device is successively composed, from an autostereoscopic display screen, of convergent lenses covering the entire surface of the screen, followed by a concave mirror of the same focal length as the lenses. converging, placed at double its focal length with respect to the screen, and a semi-transparent mirror arranged between the convergent lenses and the concave spherical mirror and forming an angle of 45° with respect to the plane of the screen and intended to reflect part of the light rays by 90° at the return section of the concave spherical mirror. The return image is formed at the screen, of the same size and in reverse. The part of this returning image deflected by the plane mirror placed at 45° is seen through a window made in front of the device. Thus, the image of the screen seems to float in front of the observer through this viewing window. This image is displayed at 1:1 scale, being dematerialized and perpendicular to the plane of the screen.

If one pivots the screen horizontally through an axis at the bottom of the device, and through 90°, its aerial replica appears vertically at the top of the device and slightly outside the window.

Also, if the screen is a screen according to the invention allowing observation in both directions of observation, that is to say in portrait mode or in landscape mode, then a simple horizontal rotation of the plane carrying the screen translates into a vertical rotation of the aerial image passing from the horizontal format to the vertical format and vice versa according to the content to be displayed.

Such an EXOBOX™ device equipped with a display system according to the invention therefore makes it possible to float an autostereoscopic image whose orientation can change simply by rotating the screen in the EXOBOX™ and while maintaining the sensation of relief for the observer.

Such an assembly may for example be placed in a motor vehicle, the display screen being formed by a self-stereoscopic mobile phone positioned lower down. Thus, it is possible to present the relief image on the phone to the driver. This dematerialized image can be associated with a voice control system or any component simulating a tactile interaction so that the driver can control the phone in one direction or the other without changing its size and without having to manipulate it.

In addition, the addition of a diaphragm at the focal length of the concave mirror improves the quality of the image and in particular its contrast by removing a portion of the reflected rays which reform an inverted image at the plane of the screen. To do this the diaphragm is advantageously off-center, without exceeding the vertical center of symmetry of the device.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of displaying an autostereoscopic image comprising a series of N points of view numbered successively from 1 to N and formed of N elementary images interlaced according to a predetermined mixing scheme, on a mobile display screen rotating around a virtual or real axis extending perpendicularly to the display plane of the screen, said screen comprising an array of pixels arranged by rows and columns, each pixel being composed of multiple different sub-pixels of different colors each forming one point of view of the image, said screen being further overlaid by an optical component, of the cylindrical lenticular network or parallax barrier type, with a main axis inclined at an angle $\alpha_0$ with respect to the direction of the columns, and configured to allow, when said screen is oriented in a preferred direction of observation, the projection of predetermined pairs of different points of view formed from two points of view separated from each other, in the series of N points of view, of at least one point of view, respectively to the left eye and the right eye of an observer, located at a nominal distance from the screen, called the flat tint distance, said method further comprising:

pivoting of the display screen from an initial position corresponding to said preferred direction of observation to a position, called the rotated position, detecting the pivot angle of said display screen between said initial position and said rotated position, rotating of said N elementary images forming the N points of view of an inverse angle of said detected pivot angle, interlacing of the N elementary images rotated according to said mixing scheme of the N elementary images in said initial position, displaying said N pivoted elementary images on said display screen so that an observer can perceive, on said rotated screen, a relief image extending along said preferred direction, formed of pairs of different successive points of view in said series of points of view, and projected to the right eye and the left eye of the observer, respectively.

2. The method of claim 1, wherein said pairs of points of view are projected towards said observer in said preferred direction depending on a distance, corresponding to the distance to be traveled along said preferred direction by the observer to said flat tint distance, to pass from one point of view to the other, the method further comprising calculating a modified stereoscopic base depending on said detected pivot angle so that the pairs of points of view projected towards the observer by said optical component in said rotated position are identical to those projected in the initial position in said preferred direction, so as to be able to maintain for the observer an identical sensation of relief in front of the rotated screen of said pivot angle in front of the screen before pivoting, except for pivoting of the screen which causes the axis of the observer's eyes to coincide with the axis of the lenses of the lenticular network.

3. The method of claim 1, furthering comprising detecting the axis between the eyes of an observer so as to define said preferred direction with respect to this axis.

4. The method of claim 1, wherein said detecting the pivot angle of said display screen between said initial position and said rotated position comprises detecting, at each moment, of the axis between the eyes of an observer so as to be able to define the angle between said initial direction and the axis between the eyes of the observer, the defined angle forming the pivot angle.

5. The method of claim 1, wherein said predetermined mixing scheme consists of shifting from one line to another of the pixel matrix each point of view of a sub-pixel of different color with respect to its position on the preceding line and wherein said angle αo is in the order of 18° with respect to the preferred direction.

6. The method of claim 1, wherein said predetermined mixing scheme consists of shifting from one line to another of the pixel matrix each point of view of two sub-pixels of different colors relative to its position on the preceding line and wherein said angle αo is in the order of 33° with respect to the preferred direction.

7. A system for displaying an autostereoscopic image comprising a series of N points of view numbered successively from 1 to N and formed of N elementary images interlaced according to a predetermined mixing scheme, the system comprising:
- a mobile display screen in rotation about a virtual or real axis extending perpendicularly from the display plane of the screen, said screen comprising an array of pixels arranged in rows and columns, each pixel being composed of multiple subpixels of different colors each assigned to a point of view of the image characterized in that it further comprises:
- an optical component mounted on said screen, of the cylindrical lens network or parallax barrier type, with a main axis inclined at an angle αo with respect to the direction of the columns, and configured to allow, when said screen is oriented according to a preferred direction of observation in a position, called the initial position, the projection of predetermined pairs of different points of view formed from two points of view separated from each other, in the series of N points of view, by at least one point of view, respectively to the left eye and the right eye of an observer, located at a nominal distance from the screen, called the flat tint distance,
- means for detecting a pivot angle of said display screen between said initial position and a rotated position,
- a module for the rotation of said N elementary images forming the N points of view of an inverse angle of said detected pivot angle,
- a module for the mixing of said N elementary images rotated according to said mixing scheme of the N elementary images in said initial position,
- a module for the display of said N elementary images rotated on said display screen so that an observer can perceive, pivoted on said screen, a relief image extending along said preferred direction, formed of pairs of successive different perspectives in said series of points of view and projected to the right eye and the left eye of the observer, respectively.

8. The system according to claim 7, wherein said pairs of points of view projected towards said observer in said preferred direction depending on a distance, called the stereoscopic base, corresponding to the distance to be traveled along said preferred direction by the observer to said flat tint distance, to pass from one point of view to the other; it further comprises a module to calculate a modified stereoscopic base depending on said detected pivot angle so that the pairs of points of view projected towards the observer by said optical component in said rotated position are identical to those projected in the initial position in said preferred direction, so as to be able to maintain for the observer an identical sensation of relief in front of the rotated screen of said pivot angle in front of the screen before pivoting to the initial position.

9. The system according to claim 7, further comprising a means for detecting the axis between the eyes of an observer so as to define said preferred direction with respect to this axis.

10. The system according to claim 7, wherein said means for detecting a pivot angle comprises a device for detecting, at each moment, the position of the observer's eyes in such a way that the angle between said initial direction and the axis between the eyes of the observer may be defined, this angle forming the pivot angle and defining said preferred direction of observation.

11. The system according to claim 7, wherein said means for detecting a pivot angle of said display screen between said preferred position and a rotated position comprises an inertial unit integral with said screen display.

12. The system according to claim 7, wherein said display screen is an 8-point screen.

13. The system according to claim 7, wherein said display screen is a display screen of a touch tablet or smartphone.

* * * * *